United States Patent [19]

Hersman et al.

[11] Patent Number: 5,344,183

[45] Date of Patent: Sep. 6, 1994

[54] MULTI-LAYER AIR BAG COVER WITH FILLED REINFORCED VINYL

[75] Inventors: Marie J. Hersman, Durham; Wayne C. Salsibury, Middleton, both of N.H.

[73] Assignee: Davidson Textron Inc., Dover, N.H.

[21] Appl. No.: 62,239

[22] Filed: May 17, 1993

[51] Int. Cl.⁵ .............................................. B60R 21/16
[52] U.S. Cl. ................... 280/728 B; 264/46.5; 264/257
[58] Field of Search ............ 280/728 B, 732, 743 R

[56] References Cited

U.S. PATENT DOCUMENTS

| | | | |
|---|---|---|---|
| 4,562,025 | 12/1985 | Gray | 264/162 |
| 4,610,835 | 9/1986 | Ghavamikia | 264/250 |
| 4,900,489 | 2/1990 | Nagase et al. | 264/46.5 |
| 4,957,684 | 9/1990 | Kia | 264/257 |
| 5,002,307 | 3/1991 | Heidorn | 280/728 B |
| 5,096,221 | 3/1992 | Combs et al. | 280/728 B |
| 5,161,819 | 11/1992 | Rhodes, Jr. | 280/728 B |
| 5,179,132 | 1/1993 | Mizuno et al. | 280/728 B |

*Primary Examiner*—Kenneth R. Rice
*Attorney, Agent, or Firm*—Reising, Ethington, Barnard, Perry & Milton

[57] ABSTRACT

A reinforced vinyl shell comprises a two layer construction for covering air bag doors that open through the shell when an air bag is deployed. The reinforced vinyl shell includes a first layer of unreinforced vinyl and a second layer is fused to the first layer and is formed of a vinyl material mixed with reinforcing fibers. Such fibers are randomly dispersed in the vinyl and may be comprised of fillers, such as glass, recycled RIM, or recycled vinyl. Other thermoplastic castable materials may be used in place of the vinyl.

11 Claims, 2 Drawing Sheets

MULTI-LAYER AIR BAG COVER WITH FILLED REINFORCED VINYL

TECHNICAL FIELD

The invention relates to a method and apparatus for making reinforced plasticized shells as trim articles suitable for use in automobile trim components such as interior door panels and instrument panels.

BACKGROUND OF THE INVENTION

The automotive industry has turned to the use of interior trim components such as door panels and comprising a polyvinylchloride shell. These components are utilized because they permit a wide latitude in styling and color, and grain effects which are most desirable in the interior design of automobiles. The current state of the art includes pre-formed grained vinyl shell made from dried thermoplastic powdered particles which are applied to a heated shell mold from a powder box to form a continuous one-piece shell. Such is illustrated in U.S. Pat. No. 4,562,025, issued Dec. 31, 1985 in the name of Gray.

These types of shells have also been used for instrument panels having an air bag deployment system therein, such as illustrated in U.S. Pat. No. 5,161,819, issued Nov. 10, 1992, assigned to the assignee of the subject invention. Typical air bag doors having a vinyl layer matching the outer vinyl layer of the instrument panel. Such vinyl layers are bonded to a layer of urethane foam at an interface. The vinyl and foam define a cover for an insert that includes either a single hinged door or a pair of doors that remain closed until an air bag is deployed. One problem with such constructions is that the vinyl material is thermoplastic. At elevated temperatures, such as occur on sunny days, the vinyl layer will have increased elongation properties. Thus, when the door or doors are swung open, upon inflation of an air bag, they will direct a separation force on the vinyl layer causing it to elongate. Such elongation will cause the vinyl layer to separate from the foam and from a bubble that balloons outwardly from the foam such "ballooning" at high temperatures, as the door is opened, can cause foam particles to separate from the foam layer as the foam and vinyl layers are separated at tear lines defined by the edges of the door or doors.

It is also known to add materials to or provide additional layers to vinyl materials to change the properties thereof, such as for strengthening. U.S. Pat. No. 4,900,489, issued Feb. 13, 1990 in the name of Nagase et al discloses a method for forming a skin foam article wherein the mold is filled with powdered polyvinyl chloride and fused together within the mold, and a second layer of expandable powder is dumped thereon. The mold is heated to expand the expandable powder, cooled, and the article demolded.

U.S. Pat. No. 4,610,835, issued Sep. 9, 1986 in the name of Ghavamikia, and U.S. Pat. No. 4,957,684, issued Sep. 18, 1990 in the name of Kia, both disclose fiber reinforced panels.

The '835 patent discloses a method of making a smooth surface with glass fibers therein. The method is practiced by coating the surface of a premolded glass fiber mat reinforced plastic panel maintained at room temperature with a room temperature curable polyurethane composition, and applying molding pressure on the coated surface to cause the coating resin to flow and fill the valleys between the glass fibers.

The '684 patent discloses the use of a fiber reinforced mat in a mold cavity. The disclosed method includes pouring a polymeric material into the cavity, saturating the glass fiber mat, closing the two mold members together with at least one layer of the flexible sheeting material disposed over and adjacent the interior mold surface, clamping the molds together, and curing the polymeric material for a time to harden the plastic panel.

The use of reinforced glass fibers in vinyl shells for instrument panels and other covers for air bag assemblies has been found unsuitable since glass fibers read through the outer (visually observed) surface of the air bag cover and cause a shimmery appearance.

SUMMARY OF THE INVENTION

The invention includes a method of making a cast thermoplastic reinforced shell. The method includes steps of casting a first layer of unreinforced thermoplastic castable material as an outer decorative layer in a mold, casting a second layer of thermoplastic castable material and randomized reinforcing material mixed therein on the first layer, heating the mold and first and second layers to fuse the thermoplastic castable material of the first and second layers to one another, and cooling and removing the formed thermoplastic reinforced shell comprising the first and second layers thermoplastic material with reinforcing material interspersed within the second layer.

Also included is a multiple layer thermoplastic shell which comprises a first layer of material including a unreinforced thermoplastic castable material cast in a predetermined form establishing an outer decorative layer, and a second layer of material bonded to the unreinforced thermoplastic castable material including thermoplastic material mixed with a randomized reinforcing material and fused to the first layer for decreasing high temperature elongation of the multiple layer thermoplastic sheet.

Another feature to the invention is to provide a thermoplastic shell for a foam covered air bag deployment door that is opened through the thermoplastic shell during air bag deployment wherein the thermoplastic shell is comprised of fused first and second layers including an outer decorative thermoplastic layer and an inner reinforced thermoplastic layer that have high temperature elongation that is less than decorative thermoplastic alone so as to prevent ballooning between a thermoplastic shell and a foam cover for the air bag deployment door.

FIGURES IN THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
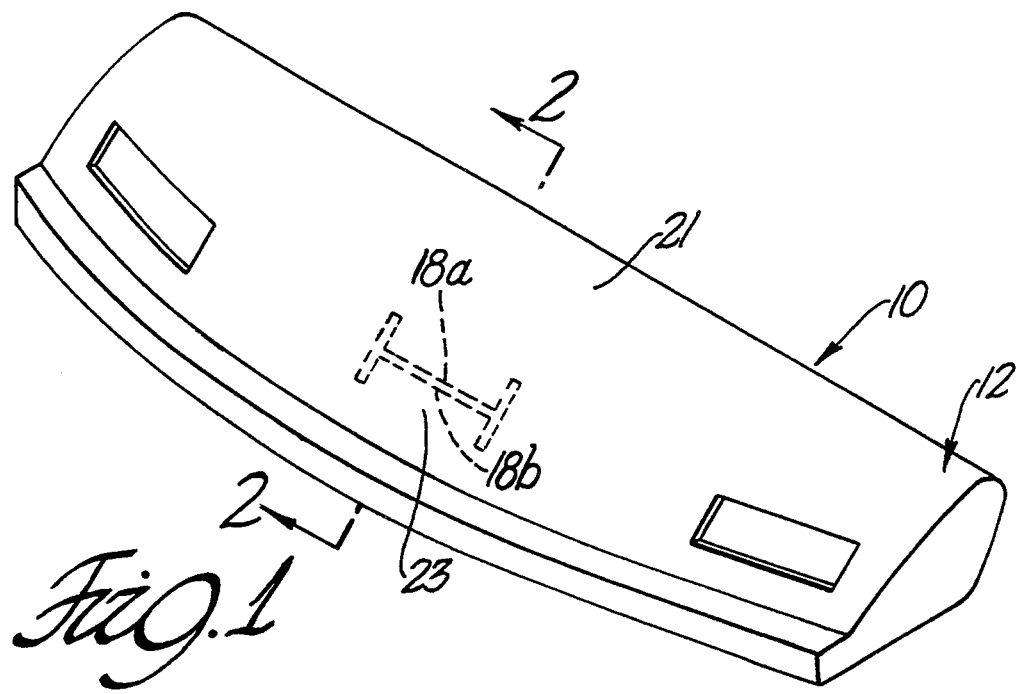
FIG. 1 is a perspective view of an application as an instrument panel of the subject invention.
Figure 2:
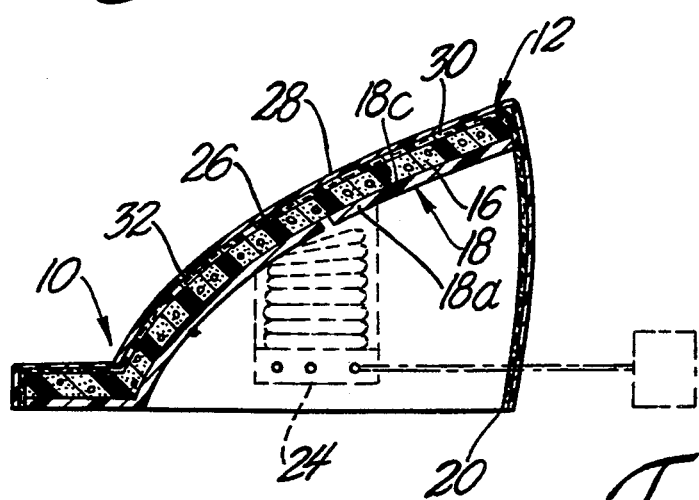
FIG. 2 is a cross-sectional view taken along lines 2—2 of FIG. 1.
Figure 3:
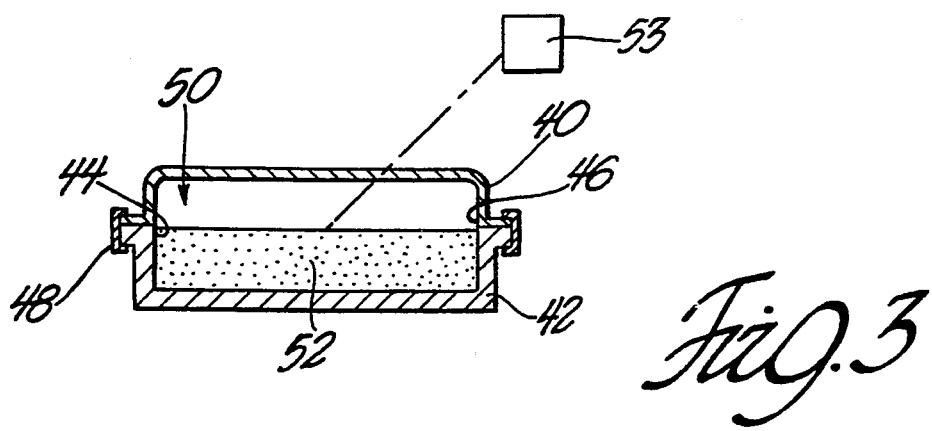
FIG. 3 is a diagrammatically shown sectional view of a mold for casting the first layer.

An automobile trim component is generally illustrated at 10 in FIGS. 1 and 2. The trim component comprises a single or multi-piece interior plastic shell 12. The shell 12 may be made of polyvinyl chloride (PVC) material which material may be backed with a layer of polyurethane foam 16 which is bonded to the shell 12 by a mold process such as in U.S. Pat. No. 3,123,403, issued Mar. 3, 1964. An interior reinforcing insert 18 is connected to the outer shell 20 to form an interior space 22 for mechanisms or components. The interior reinforcing insert 18 has a pair of doors 18a, 18b that are hinged at 18c, 18d. The doors 18a, 18b swing upwardly when an air bag 24 is deployed so as to break the shell 12 and foam 16 and form an opening therethrough for passage of the inflated air bag 24 into the passenger compartment of a motor vehicle.

In accordance with the present invention, the shell 12 is a one-piece plastic part with an integral panel of a dry cast plastic having multiple or single colors. The instrument panel may be formed by multiple components, such as one shell segment forming the general instrument panel 21 and another shell segment forming a cover 23 for an air bag deployment system 24. Typical air bag deployment systems may be as those illustrated in U.S. Pat. No. 5,161,819. As an alternative, the instrument panel may be formed with invisible SIR doors. In the past, air bag doors included a vinyl layer matching the outer vinyl layer of the instrument panel. Such constructions could be susceptible to "ballooning" at high temperatures when the door is broken in which the vinyl cover 23 is separated from the foam layer 16 such that the foam can be torn which will result in undesirable debris.

The shell 12 generally includes a multi-layer construction which has modified physical properties to enhance deployment of air bags such as weakened seams in the vinyl material shown as an H configuration in FIG. 1. It is to be understood that the teachings of the invention are readily adapted to other applications wherein other properties may be modified accordingly. Other thermoplastic castable materials may be used in place of vinyl, such as thermoplastic olefin and thermoplastic urethane.

The multi-layer construction 26 of the present invention comprises a first outer layer 28 of base material, i.e., PVC vinyl without any added reinforcing material or other pure thermoplastic castable slush mold material. For example, the vinyl material is preferably virgin material selected from the group comprising polyvinyl chloride, or vinyls based on vinyl monomer or vinylidene monomers including polyvinyls and vinyl copolymers. A second layer 30 comprises the base thermoplastic castable material utilized in the first layer 28 in combination with a reinforcing material 32. The reinforcing material 32 is randomly interspersed throughout the base layer 30 to change and affect the properties of the virgin base material. Such reinforcing material 32 may be comprised of glass fibers, recycled RIM scrap material, cryogenic recycled vinyl, or similar reinforcing materials. Each of these materials, when used in approximately less than 50% with the base material will be encompassed with the base material matrix. Use of such reinforcing material has significantly decreased hot elongation characteristics which are important when air bag doors that are deployed through covers having high temperatures such as instrument panel covers in steering wheel air bag covers that are exposed to direct sunlight through vehicle windows on hot summer days. The two vinyl layer reduces hot elongation in the multi-layer construction 26. Accordingly, "ballooning" is reduced.

Glass fibers 32 in the base layer 30 generally cause a undesirable shimmery appearance to the class A surface. The first layer 28 of virgin base material provides a desired decorative appearance while preventing such a shimmery affect. However, the multi-layer construction has desired physical property required for hot deployment functional performance as will be hereinafter described.

The method for making the multi-layer construction 26 of shell 12 utilizes a powder molding process which is schematically shown in the FIGS. 3-6 as including a selectively heated mold 40 of a contour corresponding to the desired resulting shape a cover for an air bag assembly. A powder box 42 is operated between raised and lowered positions with the mold 34 as disclosed in U.S. Pat. No. 4,562,025, set forth in the Background of the Invention. The powder box 42 includes an upper open end 44 which is configured to cover the planar extent of an opening 46 of the mold 40. Clamps 48 join and seal the powder charge box 42 to the mold 40 when the box 42 is elevated and rotated with the mold 40. The interior of the charge box 42 and the interior of the mold 40 form a closed system 50 with the chamber therein having powder charges in the box 42.

Figure 4:
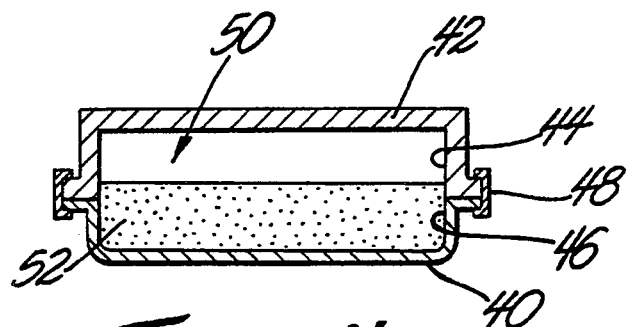
FIG. 4 is a diagrammatically shown sectional view of a mold of FIG. 3 and rotated for casting the first layer.
Figure 5:
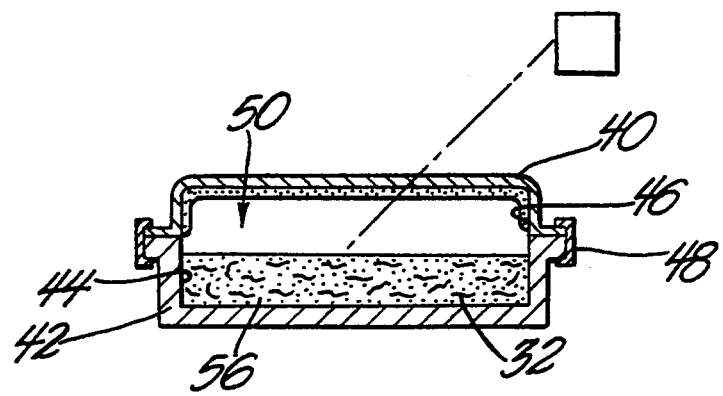
FIG. 5 is a diagrammatically shown sectional view of the mold showing the application of a second layer material in the mold containing the cast first layer.
Figure 6:
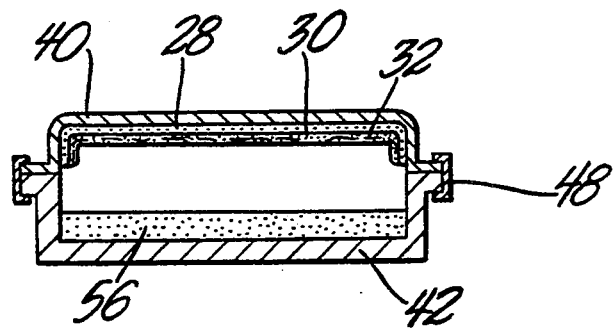
FIG. 6 is a diagrammatically sectional view of the mold with the first and second layers fused to one another.

In the process, the powder box 42 is provided with a charge of virgin thermoplastic castable powder material 52, i.e., vinyl, from a charge source 53 and the mold 40 is clamped to and over the powder box 42. The mold 40 is preheated for a set amount of time. Thereafter, the first layer 30 of vinyl material is cast to form an outer decorative layer in the mold 40 by rotation of the closed system 50 such that the powder material 52 is distributed by gravity (or by centrifugal distribution) to fall against the mold 40 (FIG. 4). The thermoplastic powder is distributed evenly throughout the mold opening 46. A resultant, even build-up of plastic particles occurs on the preheated surface of the mold 40. Following this fill step, the joined mold 40 and charge box 42 are again rotated so that the mold 40 is located vertically above the charge box 42 such that any excess of powder falls into the powder charge box 42. Heating of the mold 40 continues for approximately 30 seconds (for vinyl) while the powder material is fused together forming the first layer 28. Thereafter, the mold 40 is opened and excess virgin material is dumped from the charge box 42. Second powder material comprising the base material, i.e., vinyl, and reinforcing material 56 is provide in the powder box 42 (or in a like box) (FIG. 5). The mold 40 is closed and clamped to the powder box 42. Again, the powder box 42 and mold 40 are rotated such that the mold 40 is in the lower position with the material 56 in the powder box 42 falling against the mold surface. Heating of the mold 40 fuses some of the second layer material to the first layer 28. The system 50 is again rotated to allow excess powder thermoplastic material and reinforcing material 56 of the second layer to fall to the powder box 42 (FIG. 6). Thereafter, heating of the mold 42 is continued to fuse the powder thermoplastic material and reinforcing material for forming the second layer 30 and bonding it to the first layer 28. Thereafter, the mold 40 is cooled and the multi-layer construction 26 is stripped from the mold 40.

The powder fuse cycle is carried out with well known practices wherein the mold powder is completely fused into the desired thin-walled hollow part. Multi-colored shells may be formed as disclosed in U.S. Pat. No. 4,562,025.

For example, when using a PVC material, the mold 40 is preheated in an oven to a temperature of between 250° F. and 390° F. After the mold 40 has reached the temperature, the casting of the powder occurs. Dwell time of powder against the mold is approximately 8 seconds, though for thicker shells more time is desired, and for thin shells less time. After removal of the excess powder, the mold 40 is returned to the oven for curing and heating for approximately 5 minutes. The times and temperatures are repeated for the second layer. PVC resin, plasticized, stabilizer, release agents and color pigments are combined in a high intensity mixer to produce a dry, flowable powder of each desired color. The process is known in the industry as dry blended. However, it is to be understood different temperatures and dwell times may be utilized and determined depending on the thermoplastic castable material utilized.

The various compound components may be selected as to type and ratio to provide the properties required both for the finished product and for each processing step. Generally, any type of polyvinyl material may be utilized based on the teachings of the invention. An example of polyvinyl chloride which has successfully been utilized is a flexible PVC of Shore N, hardness 40–90 durometer. The first layer is generally of a minimum thickness of 0.005 inch. In regard to the reinforcing material, glass fiber coated with a binder has been utilized. Such may be of the type Owens Corning Fiberglass, hammer milled glass. The size of the reinforcing fiber may also be varied depending on properties desired. Sizes of 1/64-⅛ inch have been utilized to create a homogeneous blend with the vinyl dependent on the binder utilized. Recycled RIM may be mesh sizes 18–50. The glass reinforcement generally can be used in a blend with vinyl of 2%–40%.

Various tests have been conducted to determine the change in elongation characteristics. The following chart illustrates such experimentation:

| Material: Second Cast | Elongation at 180° F. |
|---|---|
| 100% vinyl | 887%, 885%, 773% |
| 100% vinyl/0.07 (vol. ratio) glass/vinyl mix | 688%, 605% |
| 100% vinyl/0.14 (vol. ratio) glass/vinyl mix | 536% |

It can be seen that the elongation characteristics decrease with the added glass reinforcing material of the second layer.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A method of making a cast thermoplastic reinforced shell, the method including the steps of:
   casting a first layer of unreinforced thermoplastic castable material as an outer decorative layer in a mold,
   casting a second layer of thermoplastic castable material and randomized reinforcing material mixed therein on the first layer,
   heating the mold and first and second layers to fuse the first and second layers to one another, and
   cooling and removing the formed thermoplastic reinforced shell comprising the first and second layers of thermoplastic with reinforcing material interspersed within said second layer.

2. A method as set forth in claim 1 further including mixing the thermoplastic castable material and reinforcing material with one another in a randomized manner prior to casting in the mold.

3. A method as set forth in claim 2 further including mixing glass fibers as the reinforcing material.

4. A method as set forth in claim 2 further including mixing thermoplastic castable material with the reinforcing material of the second layer as the same thermoplastic castable material utilized in the first layer.

5. A method as set forth in claim 4 further including forming the thermoplastic reinforced shell as a portion of an instrument panel and air bag cover.

6. A method as set forth in claim 5 further including using vinyl as the thermoplastic castable material.

7. A multi-layer shell comprising:
   a first layer of material including a thermoplastic castable material molded in a predetermined shape forming an outer decorative layer,
   a second layer of material fused to said first layer of material; said second layer of material including first particles of thermoplastic castable material and particles of randomized reinforcing material and said first and second particles fused to said first layer.

8. The multi-layer shell of claim 7 wherein said first particles of thermoplastic castable material are a mixture of virgin vinyl material and recycled vinyl material.

9. The reinforced shell as set forth in claim 7 wherein said second particles of randomized reinforcing material comprises glass fibers.

10. The multi-layer shell as set forth in claim 7 further comprising an exterior door of an air bag deployment system of a vehicle and a layer of foam interposed between said exterior door and said multi-layer shell;
    said second layer of material reducing ballooning of said multi-layer shell with respect to said layer of foam as said exterior door is deployed into an open position through said foam layer and said multi-layer shell.

11. The multi-layer shell as set forth in claim 9 further comprising an exterior door of an air bag deployment system of a vehicle and a layer of foam interposed between said exterior door and said multi-layer shell;
    said second layer of material reducing ballooning of said multi-layer shell with respect to said layer of foam as said exterior door is deployed into an open position through said foam layer and said multi-layer shell.

* * * * *